United States Patent Office.

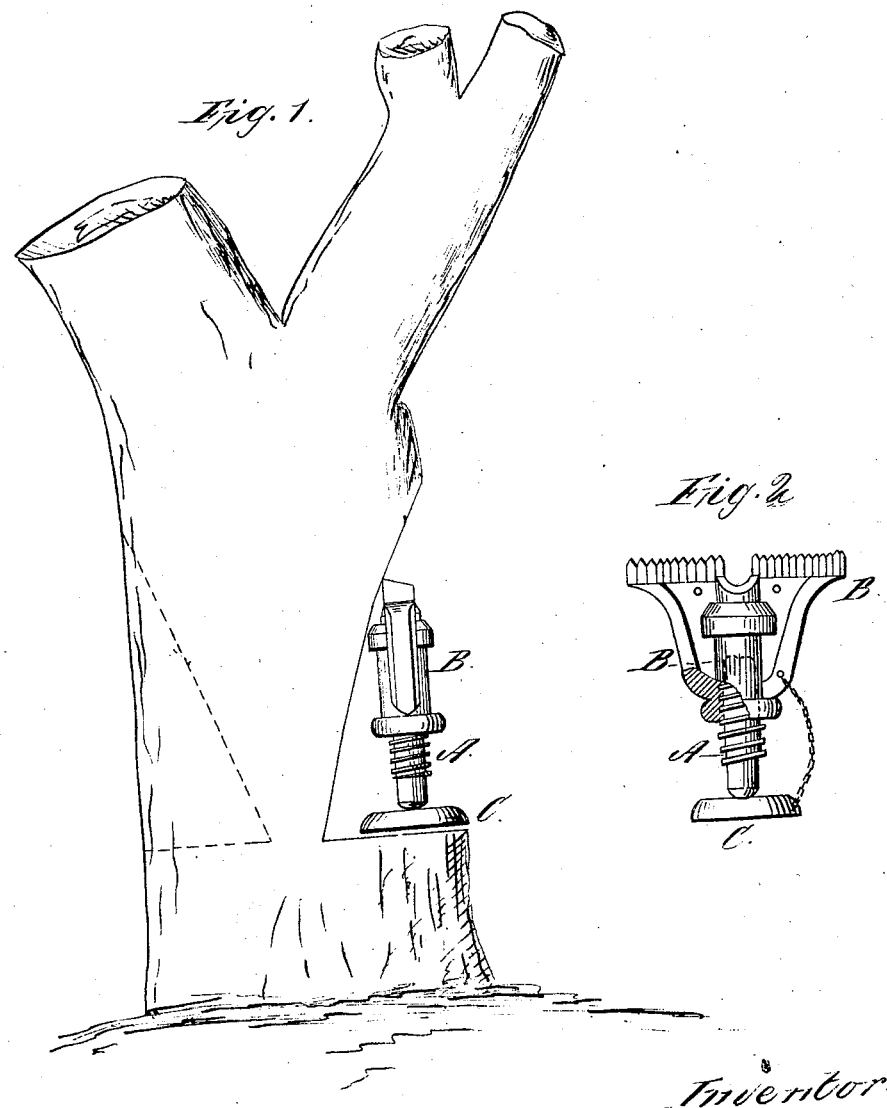

HENRY J. BEARD, OF NEW SHARON, MAINE, ASSIGNOR TO HIMSELF AND JAMES HAWES, JR.

Letters Patent No. 108,675, dated October 25, 1870.

IMPROVEMENT IN MACHINES FOR FELLING TREES.

The Schedule referred to in these Letters Patent and making part of the same.

*To all whom it may concern:*

Be it known that I, HENRY J. BEARD, of New Sharon, in the county of Franklin and State of Maine, have invented a new and improved Device for Felling Trees; and I do hereby declare that the following is a full, clear, and exact description thereof, which will enable others skilled in the art to make and use the same, reference being had to the accompanying drawing forming a part of this specification.

Figure 1 represents a side elevation of my invention.

Figure 2 is a front view, partly in section, of the same.

Similar letters of reference indicate corresponding parts.

This invention relates to a new device for facilitating the throwing of felled trees in any desired direction, and for also facilitating the felling of the trees.

The invention consists in the use of a screw and nut, which are inserted in a kerf cut into that side of the tree which is opposite to where the tree is to fall, so that the lever which is produced by the screw and nut not only prevents the falling of the tree to that side on which the lever is applied, but will also, by being lengthened, when a second kerf is cut into the opposite side of the tree, serve to throw the tree, even if the same has not been cut very far.

A in the drawing represents a screw, of suitable length, fitted into a nut, B, of cast-iron or other suitable material. The nut B has a long narrow upper edge, which may be corrugated or roughened as shown, and which may be beveled toward one side, as indicated in fig. 1.

C is a metal shoe. The same is a plate, of suitable size, with a roughened or other lower surface, and with a depression in the upper surface, which will form a step for the screw A.

The operation of the apparatus is as follows:

Into that side of a tree which is opposite to where the tree is to fall is cut a kerf, as shown in fig. 1. The plate C is then set into this kerf, as shown, and then the screw A is set with its lower end upon the plate C.

The screw is then turned until the upper face or edge of the nut B bites against the wood, as in fig. 1. The device will then serve as a brace, to prevent the tree from falling toward the kerf in which the screw is arranged.

A kerf is then cut into the opposite side of the tree, as indicated in dotted lines in fig. 2; and if that is considered large enough, the screw is turned, by means of any suitable instrument, so as to unscrew from the nut. The lever in the first kerf will thereby be lengthened, and will cause the tree to fall toward the second kerf.

The main advantages of this invention are, first, that a tree, however inclined it may stand to one side, can still, with great ease, be thrown to the opposite side; and, second, that the tree need not be cut as much as was heretofore necessary to cause its fall, as the leverage of the screw and nut will be so great that they will give the tree the desired inclination to make it break its connection with the stump.

I claim as new and desire to secure by Letters Patent—

The tree-feller, consisting of the screw A, rounded at its lower end, which rests in the socket of a detachable step, C, and carrying a nut, B, having two radial arms, corrugated and beveled upon their upper edges, all combined and operating substantially as and for the purpose specified.

The above specification of my invention signed by me this 11th day of January, 1868.

HENRY J. BEARD.

Witnesses:
WM. F. MCNAMARA,
ALEX. F. ROBERTS.